(12) United States Patent
Zahrte, Sr.

(10) Patent No.: US 11,381,076 B2
(45) Date of Patent: Jul. 5, 2022

(54) AC CONTROLLED RELAY DRIVE CIRCUIT

(71) Applicant: The Vollrath Company, L.L.C., Sheboygan, WI (US)

(72) Inventor: Donald Zahrte, Sr., Nekoosa, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 54 days.

(21) Appl. No.: 16/537,341

(22) Filed: Aug. 9, 2019

(65) Prior Publication Data

US 2020/0052484 A1 Feb. 13, 2020

Related U.S. Application Data

(60) Provisional application No. 62/718,329, filed on Aug. 13, 2018.

(51) Int. Cl.
*H02H 9/04* (2006.01)
*H02M 7/06* (2006.01)

(52) U.S. Cl.
CPC ............... *H02H 9/04* (2013.01); *H02M 7/06* (2013.01)

(58) Field of Classification Search
CPC .. H02H 3/24; H02H 3/12; H02H 3/13; H02H 3/14; H02H 3/20; H02H 3/207; H02H 9/00; H02H 9/041; H02H 9/043; H02H 9/045; H02H 9/046; H02H 3/22; H01C 8/04; H01G 9/18; H01L 29/7424
See application file for complete search history.

(56) References Cited

U.S. PATENT DOCUMENTS

| 4,340,853 | A | | 7/1982 | Braun et al. |
|---|---|---|---|---|
| 5,321,575 | A | * | 6/1994 | Shilo ..................... H02H 9/041 361/111 |
| 5,388,021 | A | | 2/1995 | Stahl |
| 5,555,150 | A | | 9/1996 | Newman, Jr. |

(Continued)

FOREIGN PATENT DOCUMENTS

| CN | 100502192 C | 6/2009 |
|---|---|---|
| CN | 104143847 A | 11/2014 |
| WO | WO-2017/125724 A1 | 7/2017 |

OTHER PUBLICATIONS

PCT International Search Report and Written Opinion for International Application No. PCT/US2019/046012 dated Mar. 9, 2020, 12 pages.

(Continued)

*Primary Examiner* — Gustavo A Rosario-Benitez
(74) *Attorney, Agent, or Firm* — Foley & Lardner LLP

(57) ABSTRACT

A drive circuit includes a voltage input circuit, a first surge protection device, and a second surge protection device. The voltage input circuit includes a first line terminal and a second line terminal, and supplies an input voltage to the first and second line terminals. The first surge protection device is connected between the first line terminal and ground to connect the first line terminal to ground when the input voltage is supplied, and to disconnect the first line terminal from ground when the input voltage is not supplied. The second surge protection device is connected between the second line terminal and ground to connect the second line terminal to ground when the input voltage is supplied, and to disconnect the second line terminal from ground when the input voltage is not supplied.

18 Claims, 4 Drawing Sheets

(56) References Cited

U.S. PATENT DOCUMENTS

| | | | |
|---|---|---|---|
| 5,581,434 A | 12/1996 | Landler | |
| 5,654,857 A * | 8/1997 | Gershen | H02H 3/33 361/118 |
| 5,859,756 A * | 1/1999 | Pressman | H02H 3/207 361/90 |
| 6,118,639 A * | 9/2000 | Goldstein | H02H 9/042 361/55 |
| 6,160,692 A | 12/2000 | Zaretsky | |
| 6,816,350 B1 * | 11/2004 | Hoopes | H02H 3/207 361/56 |
| 7,242,566 B2 | 7/2007 | Yegin et al. | |
| 7,561,388 B2 | 7/2009 | Sung et al. | |
| 8,248,745 B2 | 8/2012 | Galang et al. | |
| 8,717,726 B2 | 5/2014 | De Palma et al. | |
| 9,997,909 B2 | 6/2018 | Sesink | |
| 2002/0159212 A1 | 10/2002 | Oughton | |
| 2006/0002043 A1 * | 1/2006 | DiSalvo | H02H 3/105 361/42 |
| 2008/0122573 A1 * | 5/2008 | Ulaner | H02H 9/06 338/21 |
| 2011/0063759 A1 * | 3/2011 | Billingsley | H01H 9/541 361/1 |
| 2011/0102052 A1 * | 5/2011 | Billingsley | H01H 9/542 327/365 |
| 2012/0147509 A1 * | 6/2012 | Mechanic | H02H 9/041 361/49 |
| 2012/0154167 A1 * | 6/2012 | Jones | H02H 9/042 361/111 |
| 2013/0258538 A1 * | 10/2013 | Billingsley | G01R 19/16547 361/90 |
| 2015/0116874 A1 | 4/2015 | Jean Charles et al. | |
| 2016/0013637 A1 | 1/2016 | Olivares Perl et al. | |
| 2016/0028226 A1 * | 1/2016 | Kuo | H02H 9/044 361/118 |
| 2017/0311396 A1 * | 10/2017 | Sadwick | H05B 45/10 |
| 2018/0183230 A1 * | 6/2018 | Kostakis | H02H 3/22 |
| 2019/0353694 A1 * | 11/2019 | Kim | G01R 31/2601 |
| 2019/0372340 A1 * | 12/2019 | Lee | H02H 9/041 |
| 2020/0028358 A1 * | 1/2020 | Ohtsu | H05B 45/37 |

OTHER PUBLICATIONS

"HI-MEG DC Dielectric Testers and Insulation Hi-Pots", The VoN Corporation, 2 Pages, 2019.

"Metal-Oxide Varistors (MOVs) TMOV and iTMOV Varistor Series", LittelFuse, 9 Pages, Sep. 14, 2017.

* cited by examiner

AC CONTROLLED RELAY DRIVE CIRCUIT

CROSS-REFERENCE TO RELATED PATENT APPLICATIONS

This application claims the benefit of U.S. Provisional Patent Application No. 62/718,329, filed Aug. 13, 2018, which is incorporated herein by reference in its entirety.

BACKGROUND

The present disclosure relates generally to the field of power surge protection circuits. More specifically, various embodiments of the present disclosure relate to an AC controlled relay drive circuit for removing one or more varistors from ground when an alternating current (AC) line is not supplied.

Generally, a surge protection circuit may include one or more varistors connected to one or more AC lines (e.g., a hot line, a neutral line, and/or the like) to provide a path to ground (e.g., earth ground) in the event of a power surge and/or transients occurring on the AC lines. For example, when another device or appliance is plugged into the AC line and turned on, a power surge and/or transient may be generated on the AC line. In this case, the varistors provide a path to ground for the power surge and/or transient in order to protect a corresponding device or appliance that is also plugged into the AC line. These varistors used for surge protection are typically designed to protect the circuit from power surges up to about 390 VAC peak to about 430 VAC peak.

During production testing, however, various marking agencies (e.g., CE mark for the European Union, UL Mark for Underwriters Laboratories, and/or the like) require that the AC operated device or appliance conform to various hi-pot (e.g., dielectric voltage-withstand test) testing requirements. For example, various agencies may require that the device be hi-pot tested using one or more hi-pot AC voltages and/or hi-pot DC voltages. During hi-pot testing, the device or appliance may be subjected to a hi-pot voltage such as, for example, about 2000 VDC to about 2500 VDC, which is well beyond the upper (or peak) limits that the varistors are designed to handle. Thus, where practical, the varistors are typically disconnected or otherwise removed from ground during hi-pot testing in order to prevent damage to the varistors. In this case, the varistors may be disconnected or otherwise removed from ground manually via the use of jumper cables (e.g., connectors), or through complex circuits that require high frequency microcontrollers (or microprocessors) that can cause electromagnetic interference (EMI).

However, some agencies, such as CE and other agencies with similar requirements, do not allow for jumper cables to be used for disconnecting/connecting the varistors during hi-pot testing. Thus, some surge protection circuits use one or more gas tubes (e.g., in lieu of varistors) to provide surge protection (e.g., during normal operations) and that are sized to allow hi-pot testing. For example, a gas tube sized for 2500V or higher breakdown voltage may allow the device to be hi-pot tested to 2500V. While such gas tubes allow the device to be hi-pot tested without requiring manual modifications to the circuit using jumper cables, for example, these gas tubes generally have slow response speeds and may require high voltages to operate, which can subject the device to high voltages and fast line transients before suppressing power surges and line transients. Thus, varistors may generally provide superior surge protection over gas tubes, since varistors typically have faster response speeds and lower clamp voltage ratings than gas tubes.

Accordingly, a circuit that can automatically remove varistors from ground when the AC line is not applied (e.g., during hi-pot testing, or the like) with minimal or no EMI concerns may be desired.

The above information disclosed in this Background section is for enhancement of understanding of the background of the present disclosure, and therefore, it may contain information that does not constitute prior art.

SUMMARY

According to an example embodiment, a drive circuit includes: a voltage input circuit including a first line terminal and a second line terminal, the voltage input circuit configured to supply an input voltage to the first and second line terminals; a first surge suppression device coupled between the first line terminal and ground, the first surge protection device configured to connect the first line terminal to ground when the input voltage is supplied, and to disconnect the first line terminal from ground when the input voltage is not supplied; and a second surge protection device coupled between the second line terminal and ground, the second surge protection device configured to connect the second line terminal to ground when the input voltage is supplied, and to disconnect the second line terminal from ground when the input voltage is not supplied.

In some embodiments, the first line terminal may be a live line terminal, the second line terminal may be a neutral line terminal, the first surge protection device may be a first varistor, and the second surge protection device may be a second varistor.

In some embodiments, the drive circuit may further include: a first node commonly coupled to each of the first and second surge protection devices; and a switch coupled between the first node and ground, the switch configured to electrically isolate each of the first and second surge protection devices from ground when the input voltage is not supplied.

In some embodiments, the switch may be configured to withstand a hi-pot testing voltage.

In some embodiments, the voltage input circuit may be an alternating current (AC) input circuit, and the input voltage may correspond to an AC input.

In some embodiments, the drive circuit may further include: a bridge rectifier capacitively coupled to the first and second line terminals, the bridge rectifier configured to convert the AC input to a direct current (DC) output for operating the switch, and the switch may be controlled in response to the DC output.

In some embodiments, the drive circuit may be a surge protection circuit.

In some embodiments, the voltage input circuit may be configured to supply the input voltage to a load electrically coupled to the first and second line terminals; and the first and second surge protection devices may be configured to provide a path for a power surge to ground to protect the load from the power surge when the input voltage is supplied.

In some embodiments, the voltage input circuit may be configured to not supply the input voltage to the first and second line terminals when the load is subjected to a hi-pot testing voltage; and the first and second surge protection devices may be configured to be automatically disconnected from ground in response to the input voltage not being supplied to protect the first and second surge protection devices from the hi-pot testing voltage.

In some embodiments, the first and second surge protection devices may be configured to be automatically disconnected from ground such that manual removal or disconnection of each of the first and second surge protection devices from ground during hi-pot testing may be unnecessary.

According to another example embodiment, an appliance includes: a load; and a surge protection circuit connected to the load, the surge protection circuit including: a voltage input circuit including a first line terminal and a second line terminal, the voltage input circuit configured to supply an input voltage to the first and second line terminals; a first surge protection device coupled between the first line terminal and ground, the first surge protection device configured to connect the first line terminal to ground when the input voltage is supplied, and to disconnect the first line terminal from ground when the input voltage is not supplied; and a second surge protection device coupled between the second line terminal and ground, the second surge protection device configured to connect the second line terminal to ground when the input voltage is supplied, and to disconnect the second line terminal from ground when the input voltage is not supplied.

In some embodiments, the first line terminal may be a live line terminal, the second line terminal may be a neutral line terminal, the first surge protection device may be a first varistor, and the second surge protection device may be a second varistor.

In some embodiments, the surge protection circuit may further include: a first node commonly coupled to each of the first and second surge protection devices; and a switch coupled between the first node and ground, the switch configured to electrically isolate each of the first and second surge protection devices from ground when the input voltage is not supplied.

In some embodiments, the switch may be configured to withstand a hi-pot testing voltage.

In some embodiments, the voltage input circuit may be an alternating current (AC) input circuit, and the input voltage may correspond to an AC input.

In some embodiments, the surge protection circuit may further include: a bridge rectifier capacitively coupled to the first and second line terminals, the bridge rectifier configured to convert the AC input to a direct current (DC) output for operating the switch, and the switch may be controlled in response to the DC output.

In some embodiments, the voltage input circuit may be connected to the load via the first and second line terminals, and the voltage input circuit may be configured to supply the input voltage to the load; and the first and second surge protection devices may be configured to provide a path to ground for a power surge to protect the load from the power surge when the input voltage is supplied.

In some embodiments, the voltage input circuit may be configured to not supply the input voltage to the first and second line terminals when the load is subjected to a hi-pot testing voltage; and the first and second surge protection devices may be configured to be automatically disconnected from ground in response to the input voltage not being supplied to protect the first and second surge protection devices from the hi-pot testing voltage.

In some embodiments, the first and second surge protection devices may be configured to be automatically disconnected from ground such that manual removal or disconnection of each of the first and second surge protection devices from ground during hi-pot testing may be unnecessary.

According to another example embodiment, a method for isolating one or more varistors in a surge protection circuit, includes: providing a surge protection circuit, the surge protection circuit including: a voltage input circuit including a first line terminal and a second line terminal, the voltage input circuit configured to supply an input voltage to the first and second line terminals; a first varistor coupled between the first line terminal and ground to provide an electrical path from the first line terminal to ground; a second varistor coupled between the second line terminal and ground to provide an electrical path from the second line terminal to ground; and a switch connected between the first and second line terminals and ground, the switch configured to connect each of the first and second varistors from ground when the switch is in a closed state, and to isolate each of the first and second varistors from ground when the switch is in an open state; connecting a load to the surge protection circuit; applying a hi-pot voltage on the load; and controlling, by the surge protection circuit, the switch to be in the open state to isolate each of the first and second varistors from ground in response to the high voltage.

DETAILED DESCRIPTION

Figure 1:
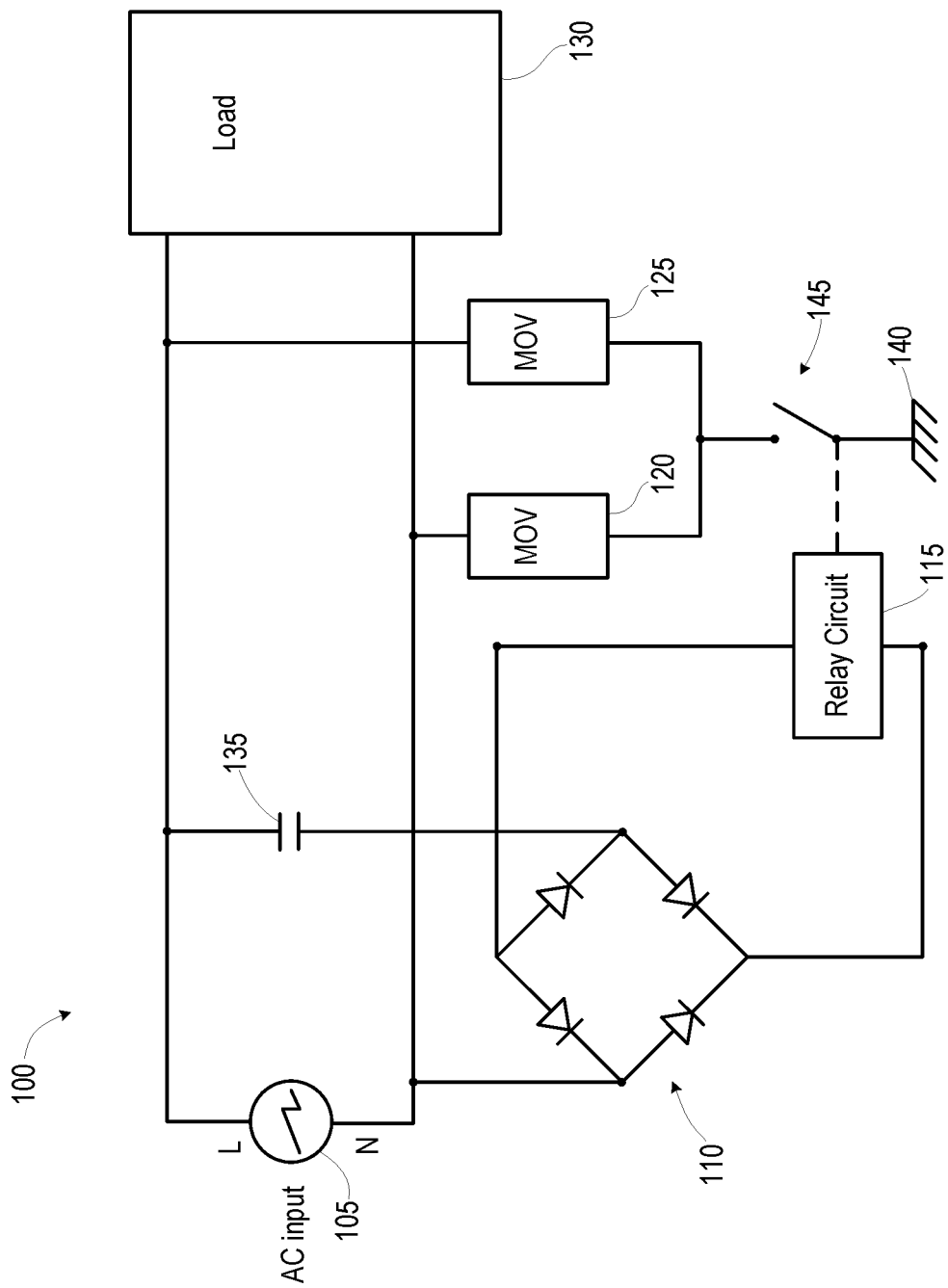
FIG. 1 is a block diagram of an AC controlled relay drive circuit, according to various example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

According to one or more aspects of various embodiments of the present disclosure, an enhanced surge protection circuit is provided that uses surge protection devices (e.g., varistors such as metal-oxide varistors "MOV," for example) to provide enhanced surge protection when a line (e.g., an AC line) is present, and to automatically isolate the surge protection devices (e.g., varistors) from ground when the line is not present. In various embodiments, the surge protection circuit is designed to operate off a frequency of the AC line (e.g., about 50 Hz to about 60 Hz) without requiring high-frequency components (e.g., a microcontroller or microprocessors) or complex clocking requirements. In various embodiments, the surge protection circuit is capacitively coupled to automatically adjust the current or voltage used to operate the circuit based on an input voltage range of the AC line.

In some embodiments, when the line is not present, the surge protection circuit according to various embodiments of the present disclosure may isolate the surge protection devices (e.g., varistors) from ground to protect the surge protection devices from high power voltages (e.g., hi-pot voltages) that are well above the upper (or peak) limits that the surge protection devices are designed to handle. For example, in some embodiments, the surge protection circuit according to one or more embodiments may enable hi-pot testing without requiring the use of jumper cables or other manual modifications to the circuit, such that the device may qualify for certifications by various marking agencies (e.g., CE and the like) that do not allow the use of jumper cables or other manual modifications to the device during testing. In some embodiments, the surge protection circuit according to one or more embodiments may provide protection from high power surges due to lighting strikes and/or other events. Accordingly, in some embodiments, quality and testing time may be improved, since the device does not need to be taken apart to manually remove/reinstall jumpers, which allows the device to stay intact. In some embodiments, reliability and manufacturing of the device is improved, since the same device can work world-wide with minimal changes to the line chord required for a given country.

FIG. 1 is a block diagram of an AC controlled relay drive circuit, according to an example embodiment. The AC controlled relay drive circuit 100 according to various embodiments may be a surge protection circuit for any suitable device, equipment, appliance, and the like, having electronics that are operated by AC power, for example, such as induction cooking equipment, AC motor drives, uninterruptible power supplies, or the like. Referring to FIG. 1, the AC controlled relay drive circuit 100 includes an AC input circuit 105, a bridge rectifier 110, a relay circuit (e.g., a relay control circuit or relay drive) 115, and a plurality of surge protection devices (e.g., varistors) 120 and 125. The surge protection devices 120 and 125 are shown to be Metal Oxide Varistors (MOVs) and may have a peak clamp voltage rating of about 390V to about 430V, but the present disclosure is not limited thereto. For example, in other embodiments, the surge protection devices 120 and 125 may be any suitable varistors or voltage-dependent resistors (VDRs), for example, such as Transient Voltage Suppressors (TVS), Transorbs, gas discharge tubes, or the like. Hereinafter, the surge protection devices 120 and 125 are referred to as varistors for convenience, but the present disclosure is not limited thereto. The AC input circuit 105 is configured to provide an AC input (e.g., an AC voltage) to a load 130 to operate the load 130. In various embodiments, the load 130 may be any suitable circuitry, device, appliance, or equipment that uses and/or includes the AC controlled relay drive circuit 100 for surge protection (e.g., electromagnetic interference filters, switching power circuitry, control circuitry, and/or the like).

In some embodiments, the bridge rectifier 110 receives the AC input from the AC input circuit 105, and converts the AC input to output a direct current (DC) output. The DC output is provided to the relay circuit 115 to operate the relay circuit 115. In various embodiments, the AC input circuit 105 is capacitively coupled (or connected) to the bridge rectifier 110 via one or more capacitors 135. The one or more capacitors 135 are sized (e.g., capacitance selected) based on the frequency of the AC input and the current needed to operate the relay circuit 115. In some embodiments, the AC controlled relay drive circuit 100 can automatically adjust the current or voltage needed to operate the relay circuit 115 based on a wide input voltage range of the AC input.

In some embodiments, the relay circuit 115 is configured to connect the plurality of varistors 120 and 125 to ground 140 when an AC line is present (e.g., the device is plugged in and the AC input is provided), and to disconnect the plurality of varistors 120 and 125 from ground 140 when the AC line is not present (e.g., the device is unplugged or the AC input is cut or removed). To this end, in some embodiments, the relay circuit 115 is configured to control a switch (or contacts) 145 to connect/disconnect the plurality of varistors 120 and 125 from ground 140 depending on whether the AC power is supplied. In some embodiments, the switch 145 may be configured and/or sized to withstand a hi-pot testing voltage. Accordingly, during hi-pot production testing, the AC controlled relay drive circuit 100 can automatically remove the plurality of varistors 120 and 125 from ground 140, and when the AC line is present, the AC controlled relay drive circuit can connect the plurality of varistors 120 and 125 to ground 140. In some embodiments, such configuration of the AC controlled relay drive circuit 100 may enable hi-pot testing of the device according to various requirements by various marking agencies, including those (e.g., CE) that do not allow jumper cables or other manual removal of the varistors 120 and 125, and may provide surge protection (e.g., due to line transients, lighting strikes, and/or the like) when an AC line is present by connecting the varistors 120 and 125 to ground. Various example embodiments of the AC controlled relay drive circuit 100 will be described in more detail with reference to FIGS. 2 through 4.

Figure 2:
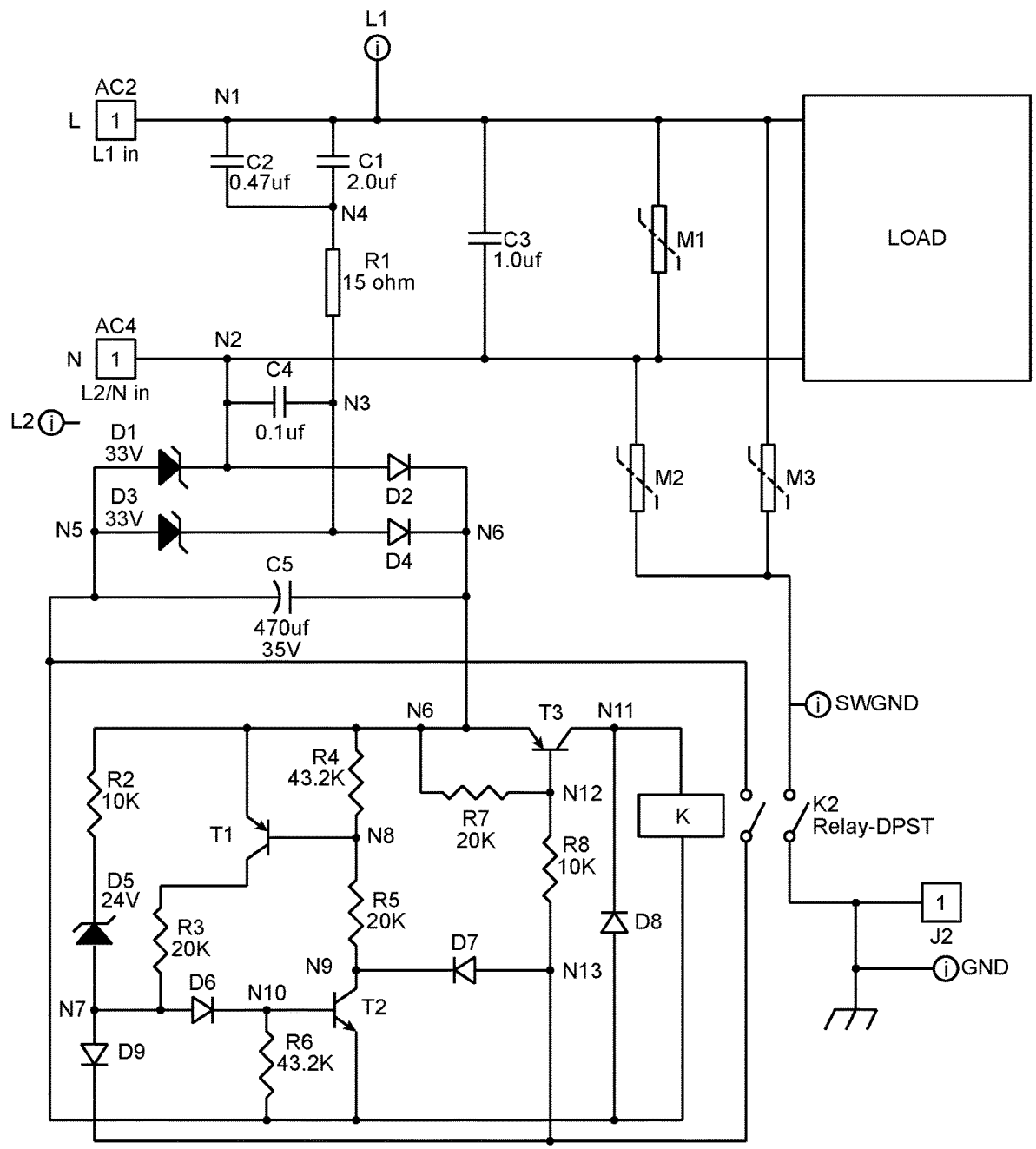
FIG. 2 is a schematic diagram of the AC controlled relay drive circuit shown in FIG. 1, according to an example embodiment of the present disclosure.

FIG. 2 is a schematic diagram of the AC controlled relay drive circuit shown in FIG. 1, according to an example embodiment. Referring to FIG. 2, the AC controlled relay drive circuit includes an AC input circuit having a live line terminal L connected to a first node N1 and a neutral line terminal N connected to a second node N2. A first electrode of a first capacitor C1 is connected to the first node N1 and a second electrode of the first capacitor C1 is connected to a first electrode of a first resistor R1. A second electrode of the first resistor R1 is connected to a third node N3. A first electrode of a second capacitor C2 is connected to the first node N1 and a second electrode of the second capacitor C2 is connected to a fourth node N4 between the second electrode of the first capacitor C1 and the first electrode of the first resistor R1. In some embodiments, a first electrode of a third capacitor C3 is connected to the first node N1 and a second electrode of the third capacitor C3 is connected to the second node N2. However, in other embodiments, the third capacitor C3 may be optional or omitted. A first varistor M1 is connected between the live line terminal L and the neutral line terminal N. That is, a first electrode of the first varistor M1 is connected to the first node N1 and a second electrode of the first varistor M1 is connected to the second node N2. A fourth capacitor C4 is connected between the second node N2 and the third node N3. Accordingly, the AC line is capacitor coupled via the first capacitor C1, the first resistor R1, and the second capacitor C2 to apply a voltage across the capacitor C4 and a bridge rectifier including a first diode D1, a second diode D2, a third diode D3, and a fourth diode D4.

A cathode of the first diode D1 is connected to the second node N2 and an anode of the first diode D1 is connected to a fifth node N5. An anode of the second diode D2 is connected to the second node N2 and a cathode of the second diode D2 is connected to a sixth node N6. An anode of the third diode D3 is connected to the fifth node N5 and a cathode of the third diode D3 is connected to the third node N3. An anode of the fourth diode D4 is connected to the third node N3 and a cathode of the fourth diode D4 is connected to the sixth node N6. The AC voltage is rectified by the bridge rectifier (e.g., including D1, D2, D3, and D4) and the rectified voltage is provided to the relay circuit to be stored across a fifth capacitor C5 (or a driving capacitor), which is connected between the fifth node N5 and the sixth node N6. The voltage stored across the driving capacitor (e.g., the fifth capacitor C5) is provided to a coil of a relay K to close the contacts (or switches) of the relay K.

In some embodiments, the relay circuit further includes a second resistor R2 having a first electrode connected to the sixth node N6 and a second electrode connected to a cathode of a fifth diode D5. An anode of the fifth diode D5 is connected to a seventh node N7. In some embodiments, the fifth diode D5 may be a Zener diode having a voltage rating of 12V, 24V, or the like, but the present disclosure is not limited thereto, and the fifth diode D5 may include any suitable diode having any suitable voltage rating depending on the coil voltage of the relay K. A first transistor T1 and a third resistor R3 is connected between the sixth node N6 and the seventh node N7. That is, a first electrode (e.g., emitter or source) of the first transistor T1 is connected to the sixth node N6 and a second electrode (e.g., collector or drain) of the first transistor T1 is connected to a first electrode of the third resistor R3. A second electrode of the third resistor R3 is connected to the seventh node N7, and a control electrode (e.g., base or gate) of the first transistor T1 is connected to an eight node N8. A fourth resistor R4 has a first electrode connected to the sixth node N6 and a second electrode connected to the eight node N8. A fifth resistor R5 has a first electrode connected to the eight node N8 and a second electrode connected to a ninth node N9. A second transistor T2 is connected between the ninth node N9 and the fifth node N5, with a first electrode (e.g., collector or drain) connected to the ninth node N9, a second electrode (e.g., emitter or source) connected to the fifth electrode N5, and a control electrode (e.g., base or gate) connected to a tenth node N10. A sixth resistor R6 is connected between the tenth node N10 and the fifth node N5, and a sixth diode D6 connected between the tenth node N10 and the seventh node N7. That is, an anode of the sixth diode D6 is connected to the seventh node N7 and a cathode of the sixth diode D6 is connected to the tenth node N10.

A third transistor T3 (e.g., a driving transistor) is connected between the sixth node N6 and an eleventh node N11, with a first electrode (e.g., emitter or source) connected to the sixth node N6, a second electrode (e.g., collector or drain) connected to the eleventh node N11, and a control electrode (e.g., base or gate) connected to a twelfth node N12. A seventh resistor R7 is connected between the sixth node N6 and the control electrode of the third transistor T3 at the twelfth node N12 to diode-couple the third transistor T3. An eight resistor R8 is connected between the twelfth node N12 and a thirteenth node N13. A seventh diode D7 has an anode connected to the thirteenth node N13 and a cathode connected to the ninth node N9. An eighth diode D8 has a cathode connected to the eleventh node N11 and an anode connected to the fifth node N5. The coil of the relay K is connected between the eleventh node N11 and the fifth node N5 in parallel with the eight diode D8. The relay K electrically connects second and third varistors M2 and M3 to ground (e.g., earth ground) when its contacts (or switches) are closed, and disconnects the second and third varistors M2 and M3 from ground when its contacts are open. A first electrode of the second varistor M2 is connected to the neutral line terminal N at the second node N2 and a second electrode of the second varistor M2 is connected to ground via the contact of the relay K. A first electrode of the third varistor M3 is connected to the live line terminal L at the first node N1 and a second electrode of the third varistor M3 is connected to ground via the contact of the relay K.

Still referring to FIG. 2, when the AC input is applied to the AC line, the AC input is rectified via the bridge rectifier (e.g., including D1, D2, D3, and D4) and stored across the driving capacitor (e.g., the fifth capacitor C5). The voltage across the driving capacitor C5 climbs until the fifth diode D5 starts to conduct via the second resistor R2. The voltage across the fifth diode D5 is applied to the control electrode of the second transistor T2 via the sixth diode D6, turning on the second transistor T2. When the second transistor T2 is turned on, current is supplied through the fifth resistor R5, the seventh diode D7, and the eight resistor R8, turning on the first transistor T1 and the driving transistor (e.g., the third transistor) T3. As the first transistor T1 is turned on, more current flows into the control electrode of the second transistor T2 via the third resistor R3 and the sixth diode D6, which latches on the driving transistor T3. The driving transistor T3 supplies voltage to the coil of the relay K, closing the contacts of the relay K. When the contacts of the relay K are closed, the second and third varistors M2 and M3 are connected to ground (e.g., earth ground).

In some embodiments, the required current to hold the contacts of the relay K in the closed state can drop to as low as 50-55% of the current required to initially close the contacts of the relay K. When the driving transistor T3 is first turned on, the energy required to close the contacts of the relay K is provided from the driving capacitor C5 (C5 is sized accordingly). The voltage of the driving capacitor C5 decreases over time so that the rectified current from the second capacitor C2, the first capacitor C1, and the first resistor R1 will support the current flowing through the coil of the relay K to maintain the contacts in the closed state. In various embodiments, the components of the AC controlled relay drive circuit of FIG. 2 can be selected and sized to turn on the relay K through a wide AC input voltage range of 85 VAC to 276 VAC. According to an embodiment, circuit simulations indicate that the AC input voltage could go as low as 30 VAC and the contacts of the relay K can still close properly.

In some embodiments, the first resistor R1 is used to limit current into the AC controlled relay drive circuit should the initial voltage on the AC input be higher than 0V when the AC line is applied, or a line transient should occur. Thus, while FIG. 2 shows that the first resistor R1 has a resistance of 15 ohms, the present disclosure is not limited thereto, and any suitable resistance may be used to limit the initial current, for example, such as 100 ohms or 150 ohms.

In some embodiments, the first diode D1 and the third diode D3 are the 'bottom diodes" of the bridge rectifier circuit, and may be Zener diodes. The first diode D1 and the third diode D3 can clamp any voltage spikes or excess energy that may come through the AC input circuit (e.g., the second capacitor C2), and may prevent over voltage of components in the AC controlled relay drive circuit, such as the various transistors (e.g., T1, T2, and T3) and the driving capacitor C5, thus, allowing for the use of inexpensive components. In some embodiments, each of the first diode D1 and the third diode D3 may be 33V Zener diodes. However, the present disclosure is not limited thereto, for example, each of the first diode D1 and the third diode D3 may be rated for different voltages, or may not be Zener diodes depending on the application.

In some embodiments, the relay K may be a Single Throw Double Pole (STDP) relay having an extra set of contacts (or switches) called AUX contacts. In this case, still referring to FIG. 2, a first terminal of the AUX contacts may be connected to the fifth node N5 and a second terminal of the AUX contacts may be connected to a cathode of a ninth diode D9. An anode of the ninth diode D9 may be connected to the seventh node N7. When the AUX contacts are closed, the third transistor T3 may be held in an on state, while turning off the first transistor T1 and the second transistor T2. The first transistor T1 and the second transistor T2 are turned off by directed the current applied to the control electrode of the second transistor T2 through the ninth diode D9, turning off the second transistor T2 which turns of the first transistor T1. In some embodiments, when the AUX contact are opened, the voltage across the driving capacitor C5 needs to climb above the Zener voltage of the fifth diode D5 before the relay K is energized. This feature may be useful when a low voltage coil is used for the coil of the relay K (e.g., 3V or 5V coils), since the driving transistor T3 is held on with a lower voltage than which the relay circuit would otherwise operate. However, the present disclosure is not limited thereto, and in other embodiments, the AUX contacts may be omitted. For example, relays with higher coil voltages may not need the use of the AUX contacts, or the AUX contacts may be omitted as desired depending on the application.

While FIG. 2 shows various sizes of the components of the AC controlled relay drive circuit, the present disclosure is not limited to the sizes shown in FIG. 2, and the sizes of the various components may be adjusted or modified as needed. For example, in other embodiments, the capacitance of each of the first and second capacitors C1 and C2 and/or the resistance of the first resistor R1 may be changed depending on the operating current or voltage required by the relay circuit and the frequency and voltage level of the AC input. In addition, while FIG. 2 shows that the transistors T1, T2, and T3 are BJT transistors, the present disclosure is not limited thereto, and in other embodiments, the transistors T1, T2, and T3 may be JFET transistors, MOSFET transistors, and/or the like. Further, while FIG. 2 shows that the transistors T1 and T3 are PNP transistors and transistor T2 is an NPN transistor, it should be appreciated that the doping types or channel-types of the transistors may be variously changed within the spirit and scope of the present disclosure.

Figure 3:
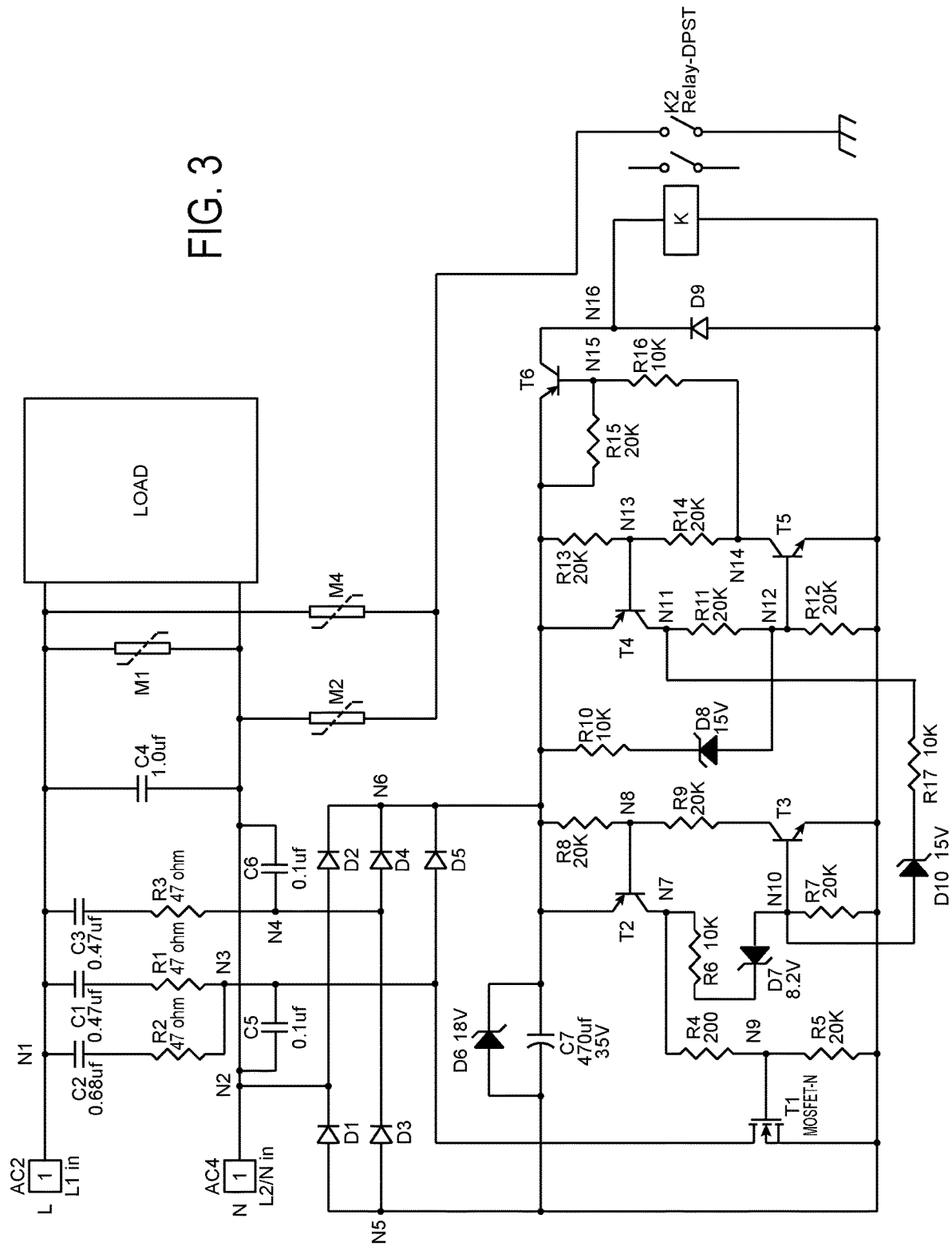
FIG. 3 is a schematic diagram of the AC controlled relay drive circuit shown in FIG. 1, according to another example embodiment of the present disclosure.

FIG. 3 is a schematic diagram of the AC controlled relay drive circuit shown in FIG. 1, according to another example embodiment. Referring to FIG. 3, the AC controlled relay drive circuit includes an AC input circuit having a live line terminal L connected to a first node N1 and a neutral line terminal N connected to a second node N2. A first electrode of a first capacitor C1 is connected to the first node N1 and a second electrode of the first capacitor C1 is connected to a first electrode of a first resistor R1. A second electrode of the first resistor R1 is connected to a third node N3. A first electrode of a second capacitor C2 is connected to the first node N1 and a second electrode of the second capacitor C2 is connected to a first electrode of a second resistor R2. A second electrode of the second resistor R2 is connected to the third node N3. A first electrode of a third capacitor C3 is connected to the first node N1 and a second electrode of the second capacitor C3 is connected to a first electrode of a third resistor R3. A second electrode of the third resistor R3 is connected to a fourth node N4. In some embodiments, a fourth capacitor C4 is connected between the first node N1 and the second node N2, but the present disclosure is not limited thereto, and in other embodiments, the fourth capacitor may be optional or omitted. A first varistor M1 is connected between the first node N1 and the second node N2. A fifth capacitor C5 is connected between the second node N2 and the third node N3, and a sixth capacitor C6 is connected between the second node N2 and the fourth node N4. Thus, the AC line terminals (e.g., L and N) are capacitor coupled via the first capacitor C1, the first resistor R1, the second capacitor C2, the second resistor R2, the third capacitor C3, and the third resistor R3 to apply a voltage across the fifth capacitor C5, the sixth capacitor C6, and a bridge rectifier including a first diode D1, a second diode D2, a third diode D3, a fourth diode D4, a fifth diode D5, and a first transistor T1.

A cathode of the first diode D1 is connected to the second node N2 and an anode of the first diode D1 is connected to a fifth node N5. An anode of the second diode D2 is connected to the second node N2 and a cathode of the second diode D2 is connected to a sixth node N6. An anode of the third diode D3 is connected to the fifth node N5 and a cathode of the third diode D3 is connected to the fourth node N4. An anode of the fourth diode D4 is connected to the fourth node N4 and a cathode of the fourth diode D4 is connected to the sixth node N6. An anode of the fifth diode D5 is connected to the third node N3 and a cathode of the fifth diode D5 is connected to the sixth node N6. A first electrode (e.g., drain or collector) of the first transistor T1 is connected to the third node N3 and a second electrode (e.g., source or emitter) of the first transistor T1 is connected to the fifth node N5. The AC voltage is rectified by the bridge rectifier (e.g., including D1, D2, D3, D4, D5, and T1) and the rectified voltage is provide to the relay circuit to be stored across a seventh capacitor C7 (or a driving capacitor), which is connected between the fifth node N5 and the sixth node N6. A sixth diode D6 is coupled in parallel with the driving capacitor C7, with an anode connected to the fifth node N5 and a cathode connected to the sixth node N6. The voltage stored across the driving capacitor C7 is provided to a coil of a relay K to close the contacts (or switches) of the relay K.

In some embodiments, the relay circuit further includes a second transistor T2 having a first electrode (e.g., emitter or source) connected to the sixth node N6 and a second electrode (e.g., collector or drain) connected to a seventh node N7. A control electrode (e.g., base or gate) of the second transistor T2 is connected to an eighth node N8. A first electrode of a fourth resistor R4 is connected to the seventh node N7 and a second electrode of the fourth resistor R4 is connected to a control electrode (e.g., base or gate) of the first transistor T1 at a ninth node N9. A first electrode of a fifth transistor R5 is connected to the ninth node N9 and a second electrode of the fifth resistor R5 is connected to the fifth node N5. A first electrode of a sixth resistor R6 is connected to the seventh node N7 and a second electrode of the sixth resistor R6 is connected to a cathode of a seventh diode D7. An anode of the seventh diode D7 is connected to a tenth node N10. A seventh resistor R7 is connected between the tenth node N10 and the fifth node N5.

In some embodiments, the relay circuit further includes an eighth resistor R8 connected between the sixth node N6 and the eighth node N8. A first electrode of a ninth resistor R9 is connected to the eight node N8 and a second electrode of the ninth resistor R9 is connected to a first electrode (e.g., collector or drain) of a third transistor T3. A second electrode (e.g., emitter or source) of the third transistor T3 is connected to the fifth node N5 and a control electrode (e.g., base or gate) of the third transistor T3 is connected to the tenth node N10. A first electrode of a tenth transistor R10 is connected to the sixth node N6 and a second electrode of the tenth transistor R10 is connected to a cathode of an eighth diode D8. An anode of the eighth diode D8 is connected to a twelfth node N12. A first electrode (e.g., emitter or source) of a fourth transistor T4 is connected to the sixth node N6 and a second electrode (e.g., collector or drain) of the fourth transistor T4 is connected to an eleventh node N11. A control electrode (e.g., base or gate) of the fourth transistor T4 is connected to a thirteenth node N13. An eleventh resistor R11 is connected between the eleventh node N11 and the twelfth node N12, and a twelfth resistor R12 is connected between the twelfth node N12 and the fifth node N5. A seventeenth resistor R17 is connected between the eleventh node N11 and a cathode of a tenth diode D10. An anode of the tenth diode D10 is connected to the tenth node N10.

In some embodiments, the relay circuit further includes a thirteenth resistor R13 connected between the sixth node N6 and the thirteenth node N13, and a fourteenth resistor R14 connected between the thirteenth node N13 and a fourteenth node N14. A first electrode (e.g., collector or drain) of a fifth transistor T5 is connected to the fourteenth node N14 and a second electrode (e.g., emitter or source) of the fifth transistor T5 is connected to the fifth node N5. A control electrode (e.g., base or gate) of the fifth transistor T5 is connected to the twelfth node N12. A fifteenth resistor R15 is connected between the sixth node N6 and a fifteenth node N15 to diode-couple a sixth transistor T6 (e.g., a driving transistor). Thus, the sixth transistor (or driving transistor) T6 has a first electrode (e.g., emitter or source) connected to the sixth node N6, a second electrode (e.g., collector or drain) connected to a sixteenth node N16, and a control electrode (e.g., base or gate) connected to the fifteenth node N15. A sixteenth resistor R16 is connected between the fifteenth node N15 and the fourteenth node N14. A ninth diode D9 is connected in parallel with the coil of the relay K between the sixteenth node N16 and the fifth node N5.

The relay K electrically connects second and third varistors M2 and M3 to ground (e.g., earth ground) when its contacts (or switches) are closed, and disconnects the second and third varistors M2 and M3 from ground when its contacts are open. A first electrode of the second varistor M2 is connected to the neutral line terminal N at the second node N2 and a second electrode of the second varistor M2 is connected to ground via the contact of the relay K. A first electrode of the third varistor M3 is connected to the live line terminal L at the first node N1 and a second electrode of the third varistor M3 is connected to ground via the contact of the relay K.

Still referring to FIG. 3, when the AC input is applied to the AC line, the AC input is rectified via the bridge rectifier and stored across the driving capacitor (e.g., the seventh capacitor C7). The voltage across the driving capacitor C7 climbs until the eighth diode D8 starts to conduct via the tenth resistor R10. The voltage across the eighth diode D8 is applied to the control electrode of the fifth transistor T5, turning on the fifth transistor T5. When the fifth transistor T5 is turned on, current is supplied through the fourteenth resistor R14 and the sixteenth resistor R16, turning on the fourth transistor T4 and the driving transistor (e.g., the sixth transistor) T6. As the fourth transistor T4 is turned on, more current flows into the control electrode of the fifth transistor T5 via the eleventh resistor R11, which latches on the driving transistor T6. The driving transistor T6 supplies voltage to the coil of the relay K, closing the contacts of the relay K. When the contacts of the relay K are closed, the second and third varistors M2 and M3 are connected to ground.

In some embodiments, compared to the AC controlled relay drive circuit of FIG. 2, additional circuitry components were added to the AC controlled relay drive circuit in FIG. 3 as described herein to maintain a minimum hold current of 50% of the nominal coil current per manufacturer specifications over the whole AC voltage input range. When the driving transistor T6 is first turned on, the energy required to close the contacts of the relay K is provided from the driving capacitor C7 (C7 is sized accordingly). The voltage of the driving capacitor C7 decreases over time so that the rectified current from the second capacitor C2, the second resistor R2, the first capacitor C1, the first resistor R1, the third capacitor C3, and the third resistor R3 will support the current flowing through the coil of the relay K to maintain the contacts in the closed state. Thus, in various embodiments, the AC controlled relay drive circuit of FIG. 3 is designed to turn on the relay K through a wide AC input voltage range of 85 VAC to 276 VAC. In some embodiments, the AC input voltage could go as low as 30 VAC and the relay K may remain active (e.g., remain on).

In some embodiments, the transistor T4 (in addition to some of the added components in FIG. 3) also helps to control the voltage applied to the coil of the relay K by applying the voltage of the driving transistor C7 to the seventeenth resistor R17. For example, in some embodiments, the AC controlled relay drive circuit is designed to hold the voltage of the coil of the relay K between 9 VDC to 16 VDC. In this case, when the voltage of the driving capacitor C7 reaches about 16 VDC via the seventeenth resistor R17 and the tenth diode D10, current through the seventeenth resistor R17 and the tenth diode D10 turns on the third transistor T3. The third transistor T3 turns on the second transistor T2 via the ninth resistor R9. When the second transistor T2 is turned on, the second transistor T2 provides more current to the control electrode of the third transistor T3 via the sixth resistor R6 and the seventh diode D7, latching the third transistor T3 on. The second transistor T2 also pulls the control electrode of the first transistor T1 to the voltage of the driving capacitor C7 through the fourth resistor R4, which turns on the first transistor T1.

When the first transistor T1 is turned on, the current provided by the first capacitor C1, the first resistor R1, the second capacitor C2, and the second resistor R2 is directly bridged to ground, taking the positive ½ cycle of energy of the AC line away from the driving capacitor C7, allowing the voltage of the driving capacitor C7 to decrease below 16 VDC. On the other hand, when the AC input voltage decreases causing the voltage of the coil of the relay K to drop below approximately 9V, then the seventh diode D7 blocks current to the base of the third transistor T3, which turns off the third transistor T3. In turn, the second transistor T2 turns off, allowing the fifth resistor R5 to turn off the first transistor T1. In this case, all of the current provided by the first capacitor C1, the first resistor R1, the second capacitor C2, and the second resistor R2 is once again provided to the coil of the relay K, increasing the voltage on the coil of the relay K. Accordingly, in some embodiments, the AC controlled relay drive circuit of FIG. 3 is designed to automatically adjust the operating current or voltage of the relay K for a wide AC input voltage range.

In some embodiments, the first resistor R1, the second resistor R2, and the third resistor R3 are used to limit current into the AC controlled relay drive circuit should the initial voltage on the AC input be higher than 0V when the AC line is applied, or a line transient should occur. Thus, while FIG. 3 shows that each of the first resistor R1, the second resistor R2, and the third resistor R3 has a resistance of 47 ohms, the present disclosure is not limited thereto, and any suitable resistance may be used to limit the initial current based on the manufacturer's specifications.

In some embodiments, the first diode D1, the third diode D3, and the first transistor T1 are the 'bottom diodes" of the bridge rectifier circuit. In some embodiments, the sixth diode D6 may be a Zener diode. The sixth diode D6 can clamp any voltage spikes or excess energy that may come through the AC input circuit (e.g., the first, second, and third capacitors C1, C2, and C4), and may prevent over voltage of components in the AC controlled relay drive circuit, such as the various transistors (e.g., T1, T2, T3, T4, T5, and T6) and the driving capacitor C7, thus, allowing for the use of inexpensive components. In some embodiments, the sixth diode D6 is an 18V Zener diode, the seventh diode D7 is a 8.2V Zener diode, the eight diode D8 is a 15V Zener diode, and the tenth diode D10 is a 15V Zener diode. However, the present disclosure is not limited thereto, for example, each of the sixth diode D6, seventh diode D7, eight diode D8, and tenth diode D10 may be rated for different voltages, or may not be Zener diodes depending on the application.

While FIG. 3 shows various sizes of the components of the AC controlled relay drive circuit, the present disclosure is not limited to the sizes shown in FIG. 3, and the sizes of the various components may be adjusted or modified as needed. For example, in other embodiments, the capacitance of each of the first second, and third capacitors C1, C2, and C3 and/or the resistance of the first, second, and third resistors R1, R2, and R3 may be changed depending on the operating current or voltage required by the relay circuit and the frequency and voltage level of the AC input. In addition, while FIG. 3 shows that the first transistor T1 is a MOSFET transistor and the transistors T2, T3, T4, T5, and T6 are BJT transistors, the present disclosure is not limited thereto, and in other embodiments, the transistors T1, T2, T3, T4, T5, and T6 may be JFET transistors, MOSFET transistors, and/or the like. Further, while FIG. 3 shows that the transistor T1 is an NMOS transistor, the transistors T2, T4, and T6 are PNP transistors, and transistors T3 and T5 are NPN transistors, it should be appreciated that the doping types or channel-types of the transistors may be variously changed within the spirit and scope of the present disclosure.

Figure 4:
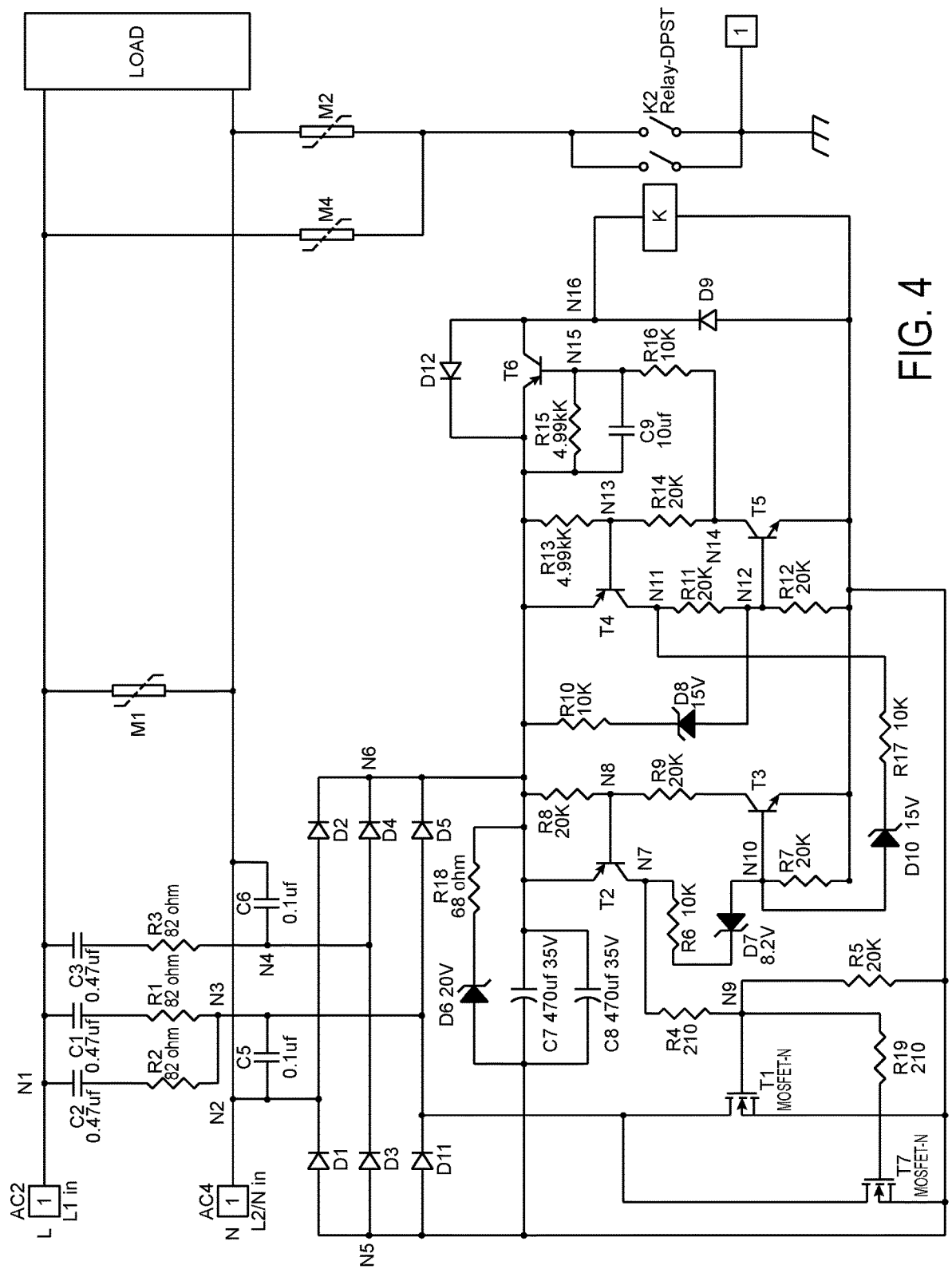
FIG. 4 is a schematic diagram of the AC controlled relay drive circuit shown in FIG. 1, according to another example embodiment of the present disclosure.

FIG. 4 is a schematic diagram of the AC controlled relay drive circuit shown in FIG. 1, according to another example embodiment. The AC controlled relay drive circuit of FIG. 4 is similar to the AC controlled relay drive circuit shown in FIG. 3 and operates in a similar or substantially similar way, but includes various enhancements that add robustness to the AC controlled relay drive circuit of FIG. 3. For example, In some embodiments, the AC controlled relay drive circuit shown in FIG. 4 may have a similar or substantially similar circuit structure as the AC controlled relay drive circuit of FIG. 3, but may be variously modified to handle higher surges (e.g., due to lighting strikes or the like). For example, compared to the AC controlled relay drive circuit of FIG. 3, the first, second, and third resistors R1, R2, and R3 have been replaced with high surge resistors that are sized to handle the higher surges, and the relay K includes AUX contacts connected between the varistors M2 and M4 and circuit ground J2. Further, in some embodiments, the AC controlled relay drive circuit of FIG. 4 additionally includes an eleventh diode D11, a twelfth diode D12, an eighth capacitor C8, a ninth capacitor C9, an eighteenth resistor R18, a nineteenth resistor R19, and a seventh transistor T7 when compared to the AC controlled relay drive circuit of FIG. 3.

In some embodiments, the eleventh diode D11 has an anode electrode connected to the fifth node N5 and a cathode electrode connected to the third node N3. The seventh transistor T7 has a first electrode (e.g., drain or collector) connected to the third node N3 and a second electrode (e.g., source or emitter) connected to the fifth node N5. The nineteenth resistor R19 is connected between a control electrode (e.g., base or gate) of the seventh transistor T7 and the ninth node N9. In some embodiments, the first diode D1, the third diode D3, the eleventh diode D11, the first transistor T1, and the seventh transistor T7 are the "bottom diodes" of the bridge rectifier circuit. In some embodiments, when a high surge current is applied to the AC line (e.g., due to lighting strikes), both the first transistor T1 and the seventh transistor T7 shunt the high surge current, which makes the AC controlled relay drive circuit of FIG. 4 more reliable when compared to the AC controlled relay drive circuit of FIG. 3 having only the first transistor T1 to shunt the current. For example, in some embodiments, the seventh transistor T7 is connected in parallel with the first transistor T1 and operates in the same or substantially the same manner as the first transistor T1, such that when the high surge occurs, both the first transistor T1 and the seventh transistor T2 shunt the current coming through the second capacitor C2, the second resistor R2, the first capacitor C1, and the first resistor R1, which may make the AC controlled relay drive circuit of FIG. 4 more robust.

In some embodiments, the eighth capacitor C8 is connected in parallel with the driving capacitor C7, and the eighteenth resistor R18 is connected between the sixth diode D6 and the sixth node N6. In some embodiments, the eight capacitor C8 and the eighteenth resistor R18 may help to limit the amount of the high surge current (e.g., due to lighting strikes) flowing through the sixth diode D6, for example, to prevent or reduce damage to the sixth diode D6. For example, due to the high surge from lighting strikes, the voltage of the driving capacitor C7 may rapidly increase such that when the sixth diode D6 (e.g., a Zener diode) clamps the voltage, the sixth diode D6 may be shorted or damaged. In some embodiments, the eighth capacitor C8 may help distribute the increased voltage on the driving capacitor C7 due to the lighting strikes, and the eighteenth resistor R18 may limit the amount of current flowing through the sixth diode D6, such that the driving capacitor C7 and the eighth capacitor C8 absorb the brunt of the surge.

In some embodiments, the ninth capacitor C9 is connected between the sixth node N6 and the fifteenth node N15, such that the ninth capacitor C9 is connected in parallel with the fifteenth resistor R15. In some embodiments, the ninth capacitor C9 maintains the voltage at the fifteenth node N15 to reduce or prevent chatter of the driving transistor T6 (e.g., to smoothly turn the driving transistor T6 on or off). The twelfth diode D12 has a cathode electrode connected to the sixth node N6, and an anode electrode connected to the sixteenth node N16. In some embodiments, the twelfth diode D12 may shunt leakage current from the coil of the relay K to the seventh and eighth capacitors C7 and C7 to prevent damage to the sixth transistor T6 due to the leakage current creating an excessive voltage on the sixteenth node N16. Accordingly, when the high surge occurs due to the lighting strikes, the AC controlled relay drive circuit may limit the amount of the high surge current or voltage from damaging various components of the circuit such that the varistors M2 and M4 can remain connected to ground to absorb the energy from the high surge.

While FIG. 4 shows various sizes of the components of the AC controlled relay drive circuit, the present disclosure is not limited to the sizes shown in FIG. 4, and the sizes of the various components may be adjusted or modified as needed. For example, in other embodiments, the capacitance of each of the first second, and third capacitors C1, C2, and C3 and/or the resistance of the first, second, and third resistors R1, R2, and R3 may be changed depending on the operating current or voltage required by the relay circuit and the frequency and voltage level of the AC input. In addition, while FIG. 4 shows that the first transistor T1 and the seventh transistor T7 are MOSFET transistors and the transistors T2, T3, T4, T5, and T6 are BJT transistors, the present disclosure is not limited thereto, and in other embodiments, the transistors T1, T2, T3, T4, T5, T6, and T7 may be JFET transistors, MOSFET transistors, and/or the like. Further, while FIG. 4 shows that the transistors T1 and T7 are NMOS transistors, the transistors T2, T4, and T6 are PNP transistors, and transistors T3 and T5 are NPN transistors, it should be appreciated that the doping types or channel-types of the transistors may be variously changed within the spirit and scope of the present disclosure.

According to various embodiments of the present disclosure, costs are reduced by using a capacitively coupled AC input to drive the automatic switching of varistors to/from ground. The AC controlled relay drive circuit according to various embodiments is entirely operated based on the frequency of the AC line (e.g., 50 Hz to 60 Hz) to generate the DC voltage or current needed to automatically switch the varistors to/from ground, without the use of complex high-frequency components requiring clock synchronization, such as microcontrollers or microprocessors or a switch mode supply operating from the AC line. Accordingly, by virtue of the use of inexpensive components simplifies the circuit and reduces costs associated with using more expensive high-frequency components.

According to various embodiments of the present disclosure, EMI concerns are reduced by virtue of the absence of high-frequency components, such as microcontrollers, microprocessors, offline switchers or offline dimmers (e.g., triacs), or the like. Because the AC controlled relay drive circuit according to various embodiments of the present disclosure is driven by the AC input itself, it is a "passive" controlled device as opposed to an "active" controlled device such as a microprocessor-driven controlled device. Thus, the AC controlled relay drive circuit according to various embodiments of the present disclosure reduces EMI concerns by eliminating the use of active control components that generate high-frequency electromagnetic signals which can cause notable interference in the circuit.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

While certain embodiments of the present disclosure have been illustrated and described, it is understood by those of ordinary skill in the art that certain modifications and changes can be made to the described embodiments without departing from the spirit and scope of the present disclosure as defined by the following claims, and equivalents thereof.

What is claimed is:

1. A drive circuit comprising:
a voltage input circuit comprising a first line terminal and a second line terminal, the voltage input circuit configured to supply an input voltage to the first and second line terminals, wherein the voltage input circuit is an alternating current (AC) input circuit, and the input voltage corresponds to an AC input;
a first surge protection device coupled between the first line terminal and ground;
a second surge protection device coupled between the second line terminal and ground; and
a relay circuit comprising a switch and powered by the voltage input circuit and configured to:
connect the first line terminal to ground when the input voltage is supplied, and to disconnect the first line terminal from ground when the input voltage is not supplied; and
connect the second line terminal to ground when the input voltage is supplied, and to disconnect the second line terminal from ground when the input voltage is not supplied; and
a bridge rectifier capacitively coupled to the first and second line terminals, the bridge rectifier configured to convert the AC input to a direct current (DC) output for operating the switch, wherein the switch is controlled in response to the DC output and configured to electrically isolate each of the first and second surge protection devices from ground when the input voltage is not supplied.

2. The drive circuit of claim 1, wherein the first line terminal is a live line terminal, the second line terminal is a neutral line terminal, the first surge protection device is a first varistor, and the second surge protection device is a second varistor.

3. The drive circuit of claim 1, further comprising:
a first node commonly coupled to each of the first and second surge protection devices.

4. The drive circuit of claim 3, wherein the switch is configured to withstand a hi-pot testing voltage.

5. The drive circuit of claim 3, wherein the voltage input circuit is an alternating current (AC) input circuit, and the input voltage corresponds to an AC input.

6. The drive circuit of claim 1, wherein the drive circuit is a surge protection circuit.

7. The drive circuit of claim 6, wherein:
the voltage input circuit is configured to supply the input voltage to a load electrically coupled to the first and second line terminals; and
the first and second surge protection devices are configured to provide a path for a power surge to ground to protect the load from the power surge when the input voltage is supplied.

8. The drive circuit of claim 7, wherein:
the first and second line terminals do not receive the input voltage when the load is subjected to a hi-pot testing voltage; and
the first and second surge protection devices are configured to be automatically disconnected from ground in response to the input voltage not being supplied to protect the first and second surge protection devices from the hi-pot testing voltage.

9. The drive circuit of claim 8, wherein the first and second surge protection devices are configured to be automatically disconnected from ground such that manual removal or disconnection of each of the first and second surge protection devices from ground during hi-pot testing is unnecessary.

10. An appliance comprising:
a load; and
a surge protection circuit connected to the load, the surge protection circuit comprising:
a voltage input circuit comprising a first line terminal and a second line terminal, the voltage input circuit configured to supply an input voltage to the first and second line terminals, wherein the voltage input circuit is an alternating current (AC) input circuit, and the input voltage corresponds to an AC input;
a first surge protection device coupled between the first line terminal and ground;
a second surge protection device coupled between the second line terminal and ground; and
a relay circuit comprising a switch and configured to:
connect the first line terminal to ground when the input voltage is supplied, and to disconnect the first line terminal from ground when the input voltage is not supplied; and
connect the second line terminal to ground when the input voltage is supplied, and to disconnect the second line terminal from ground when the input voltage is not supplied; and
a bridge rectifier capacitively coupled to the first and second line terminals, the bridge rectifier configured to convert the AC input to a direct current (DC) output for operating the switch, wherein the switch is controlled in response to the DC output and configured to electrically isolate each of the first and second surge protection devices from ground when the input voltage is not supplied.

11. The appliance of claim 10, wherein the first line terminal is a live line terminal, the second line terminal is a neutral line terminal, the first surge protection device is a first varistor, and the second surge protection device is a second varistor.

12. The appliance of claim 10, wherein the surge protection circuit further comprises:
a first node commonly coupled to each of the first and second surge protection devices.

13. The appliance of claim 12, wherein the switch is configured to withstand a hi-pot testing voltage.

14. The appliance of claim 12, wherein the voltage input circuit is an alternating current (AC) input circuit, and the input voltage corresponds to an AC input.

15. The appliance of claim 10, wherein:
the voltage input circuit is connected to the load via the first and second line terminals, and the voltage input circuit is configured to supply the input voltage to the load; and
the first and second surge protection devices are configured to provide a path to ground for a power surge to protect the load from the power surge when the input voltage is supplied.

16. The appliance of claim 15, wherein:
the first and second line terminals do not receive the input voltage when the load is subjected to a hi-pot testing voltage; and
the first and second surge protection devices are configured to be automatically disconnected from ground in response to the input voltage not being supplied to protect the first and second surge protection devices from the hi-pot testing voltage.

17. The appliance of claim 16, wherein the first and second surge protection devices are configured to be automatically disconnected from ground such that manual removal or disconnection of each of the first and second surge protection devices from ground during hi-pot testing is unnecessary.

18. A method for isolating one or more varistors in a surge protection circuit, the method comprising:
providing the surge protection circuit, the surge protection circuit comprising:
a voltage input circuit comprising a first line terminal and a second line terminal, the voltage input circuit configured to supply an input voltage to the first and second line terminals, wherein the voltage input circuit is an alternating current (AC) input circuit, and the input voltage corresponds to an AC input;
a first varistor coupled between the first line terminal and ground to provide an electrical path from the first line terminal to ground;
a second varistor coupled between the second line terminal and ground to provide another electrical path from the second line terminal to ground;
a switch connected between the first and second line terminals and ground, the switch configured to connect each of the first varistor and the second varistor to ground when the switch is in a closed state, and to isolate each of the first varistor and the second varistor to ground when the switch is in an open state; and
a bridge rectifier capacitively coupled to the first and second line terminals, the bridge rectifier configured to convert the AC input to a direct current (DC) output for operating the switch; and
connecting a load to the surge protection circuit;
applying a hi-pot voltage on the load; and
controlling, via a relay circuit powered by the voltage input circuit, the switch to be in the open state to isolate each of the first and second varistors from ground in response to the hi-pot voltage.

* * * * *